United States Patent [19]

Mihara

[11] Patent Number: 4,534,046
[45] Date of Patent: Aug. 6, 1985

[54] FLOW QUANTITY MEASURING APPARATUS

[75] Inventor: Yuji Mihara, Yokohama, Japan

[73] Assignee: Tokyo Shibaura Denki Kabushiki Kaisha, Kawasaki, Japan

[21] Appl. No.: 423,291

[22] Filed: Sep. 24, 1982

[30] Foreign Application Priority Data

Oct. 26, 1981 [JP] Japan .................................. 56-171090

[51] Int. Cl.³ .................................................. G01P 5/00
[52] U.S. Cl. ........................................ 377/21; 377/47; 73/861.77
[58] Field of Search ................... 377/47, 48, 49, 21; 73/861.77, 861.78

[56] References Cited

U.S. PATENT DOCUMENTS

| | | | |
|---|---|---|---|
| 3,935,538 | 1/1976 | Kizler et al. | 377/48 |
| 3,965,341 | 6/1976 | Honey et al. | 73/861.77 |
| 4,127,091 | 11/1978 | Leichle | 377/47 |
| 4,229,795 | 10/1980 | Vieweg | 377/49 |
| 4,241,408 | 12/1980 | Gross | 377/48 |
| 4,306,457 | 12/1981 | Fukui et al. | 73/861.77 |

*Primary Examiner*—John S. Heyman
*Attorney, Agent, or Firm*—Stevens, Davis, Miller & Mosher

[57] ABSTRACT

In flow quantity measuring apparatus of the type comprising a detection circuit which produces a pulse signal corresponding to flow speed of fluid to be measured, a converter which converts the pulse signal into an electric signal corresponding to a flow quantity of the fluid and a counter counting the number of the electric signals, the converter is constituted by a rate multiplier inputted with the signal for producing an output signal corresponding to a predetermined preset value, a register for storing the preset value, and a state change detection circuit for detecting change of a state of the register.

4 Claims, 6 Drawing Figures

FLOW QUANTITY MEASURING APPARATUS

BACKGROUND OF THE INVENTION

This invention relates to a flow quantity measuring apparatus, and more particularly a flow quantity measuring apparatus capable of detecting erroneous operations of a converting circuit in the flow quantity measuring apparatus.

A conventional flow quantity measuring apparatus for such fluids as aqueduct water, town gas, etc., was constructed as shown in FIG. 1, for example. Thus, it comprises a detection circuit 1 including an impeller, not shown, driven by the fluid to be measured for producing pulse signals corresponding to the flow speed of the fluid, a converter 2 which converts the output signal of the detection circuit 1 into a value corresponding to the flow quantity (quantity of consumption) of the fluid, a counter 3 counting the number of the output signals from the converter 2, a display circuit 4 and a display device 5 which displays the content of the counter 3 whereby to detect and display the quantity of water or gas consumed.

In the flow quantity measuring apparatus of the type described above, depending upon the volume and type of the fluid to be measured it is necessary to apply a weight (multiplying factor) to the converter 2. For example, in apparatus for measuring the quantity of aqueduct water, the converter 2 converts each revolution of an impeller in the detecting circuit 1 into the quantity of water in liters and the output of the converter is integrated by the counter 3 to determine the quantity of water used. To add a weight to the converter 2 a read only memory device ROM or wirings and switches on a printed substrate have been used. Where a ROM is used, however, it is not easy to vary the weight, whereas use of switches requires a large space.

As a method of adding a weight without accompanying these difficulties it has been proposed a method according to which a shift register and a counter are incorporated into the converter of the measuring apparatus. According to this method, the detector is constituted by a rate multiplier supplied with the pulse signal from the detection circuit 1 and a register that sets the weight (multiplying factor) of the rate multiplier. By prestoring a suitable value in the register the rate multiplier supplies a signal (number of pulses) corresponding to the measured quantity to the counter 3. With such a converter, when the flow quantity measuring apparatus is miniaturized or fabricated with an integrated circuit, the setting of the weight becomes easy and the number of pins of the integrated circuit can be reduced. However, an integrated circuit memory device, i.e., the register has a defect that its content is varied due to external noise or a momentary interruption of the power supply.

SUMMARY OF THE INVENTION

Accordingly, it is an object of this invention to provide an improved flow quantity measuring apparatus capable of readily detecting erroneous operations of the converter.

According to this invention, there is provided flow quantity measuring apparatus comprising a detection circuit which produces a pulse signal corresponding to a flow speed of fluid to be measured, a converter which converts the pulse signal into an electric signal corresponding to a flow quantity of the fluid, and a counter counting the number of the electric signals, wherein the converter includes a rate multiplier inputted with the pulse signal for producing an output signal corresponding to a predetermined preset value, a register for storing the preset value and a state change detection circuit for detecting change of a state of the register.

BRIEF DESCRIPTION OF THE DRAWINGS

In the accompanying drawings

DESCRIPTION OF THE PREFERRED EMBODIMENTS

Figure 1:
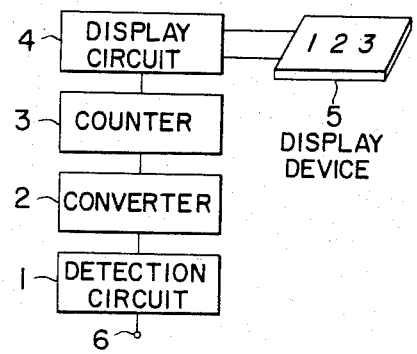
FIG. 1 is a block diagram showing a basic construction of a flow quantity measuring apparatus.
Figure 2:
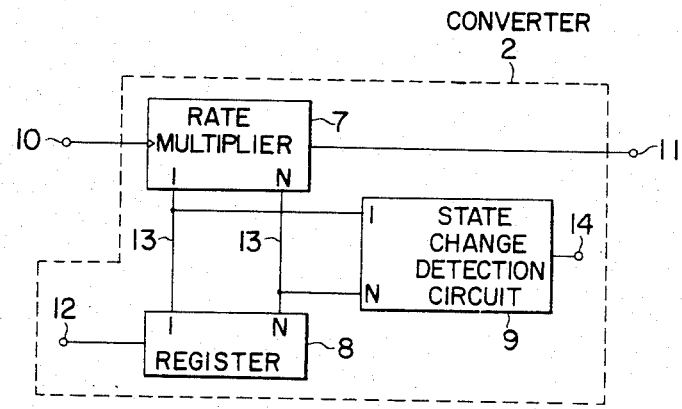
FIG. 2 is a block diagram showing one example of the converter of the flow quantity measuring apparatus embodying the invention.

The flow quantity measuring apparatus has a basic construction similar to that shown in FIG. 1 except that the converter 2 has a construction as shown in FIG. 2. As shown, the converter 2 comprises a rate multiplier 7 inputted with the pulse signal outputted from the detection circuit 1 to produce pulses of a number corresponding to a preset value, a semiconductor register 8 that holds the preset value of the rate multiplier 7 and a state change detection circuit 9 detecting a change in the content stored in the register 8 or an output thereof. More particularly, the pulse signal from the detection circuit 1 is applied to the rate multiplier (weight multiplier) 7 via an input terminal 10 for supplying a pulse corresponding to a weight (multiplying factor) preset in the rate multiplier 7 to the counter 3 through an output terminal 11. The weight to be set in the rate multiplier 7 is inputted to the register 8 through its input terminal 12 and then set in the rate multiplier 7 via N signal lines 13. The output of the register 8 indicative of the set value in the rate multiplier 7 is also applied to the state change detection circuit 9, so that when the state of the content or output of the register 8 changes, the state change detection circuit 9 produces an output signal at its output terminal 14.

Figure 3:
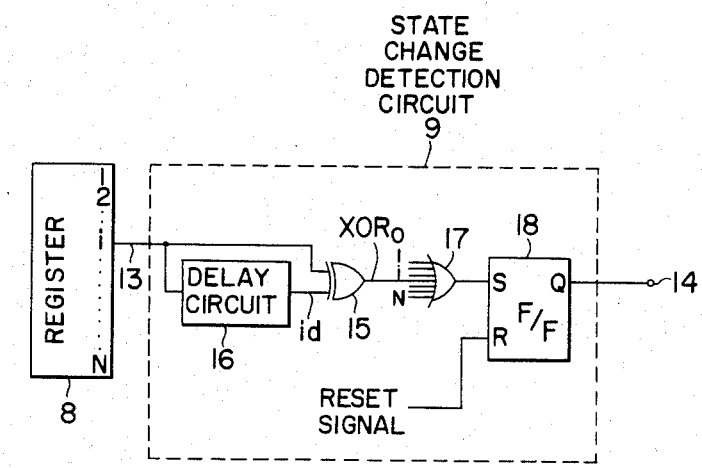
FIG. 3 is a connection diagram showing the state change detection circuit shown in FIG. 2.

The construction of the state change detection circuit 9 is shown in FIG. 3. Thus, each of the signal lines 13 from the register 8 is inputted to one input of an exclusive OR gate circuit 15 and a delay circuit 16. The signal passed through the delay circuit 16 is applied to the other input of the exclusive OR gate circuit 15 and the output thereof is applied to the set terminal S of the RS type flip-flop circuit 18 via an OR gate circuit 17 having N input terminals.

Figure 4:
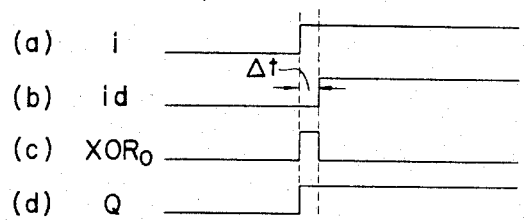
FIG. 4 is a timing chart showing signals at various portions of the circuit shown in FIG. 3.

In the timing chart shown in FIG. 4, curve (a) shows the output i of the register 8, curve (b) the output id of the delay circuit 16, curve (c) the output $XOR_0$ of the exclusive OR gate circuit 15, and curve (d) the output Q of the flip-flop circuit 18.

The operation of the state change detection circuit 9 will now be described with reference to FIG. 4. Where the state of the first bit of the output of the register 8 does not change, since the input signals to the two input terminals of the exclusive OR gate circuit 15 have the same value, the output $XOR_0$ of the exclusive OR gate circuit 15 is "0". Consequently, if all input signals to the OR gate circuit 17 are "0", the output Q of the flip-flop circuit 18 would be "0". Should the state of the first bit of the output of the register 8 have changed due to external noise or a momentary drop in the source voltage, the signal passed through the delay circuit 16 delays by a time $\Delta t$ (see FIG. 4b). For this reason, the output $XOR_0$ of the exclusive OR gate circuit 15 inputted with the output i of the register 8 and the output id of the delay circuit 16 becomes "1" during the delay time $\Delta t$ (see FIG. 4c). This output signal $XOR_0$ is applied to the set terminal S of the flip-flop circuit 18 via OR gate circuit 17, thus setting the output Q of the flip-flop circuit 18. As above described, when either one of the bits of the output from the register 8 changes, such change is inputted to the flip-flop circuit 18, thus producing a signal "1" at its output terminal 14. This signal "1" is displayed on a display device to display the fact that the state of the output signal of the register 8 has changed. Even when data are written into the register 8 from outside, the state change detection circuit 9 shown in FIG. 3 operates to produce an output "1". In this case, however, the flip-flop circuit 18 is initialized by applying a reset signal of "1".

The embodiment described above has the following advantages. Thus, when the content of the register 8 storing the set value of the rate multiplier 7 changes, correct convertion operation cannot be assured so that the flow quantity measuring apparatus would display an erroneous measured value. Accordingly, the checking as to whether an erroneous measurement is made or not is impossible with such a flow quantity meter as an aqueduct water meter after it has once been installed. However, as above described by providing the state change detection circuit 9 for the converter 2 it becomes possible to detect the erroneous operation of the converter by comparing the displayed integrated flow quantity with the needles of the aqueduct water meter. Further, when the readings of the meter are transmitted to a remote measuring center, fault of the aqueduct water meter can be detected. Since the state change circuit 9 is constituted by an exclusive OR gate circuit 15 and a delay circuit 16 irrespective whether the initial state of the first bit of the output of the register 8 is "0" or "1", it is possible to detect the changes in the states of "1"→"0" and "0"→"1". As a consequence, without the necessity of storing the initial state in a separate memory means, the change in the state of the content of the register 8 can be confirmed.

Figure 5:
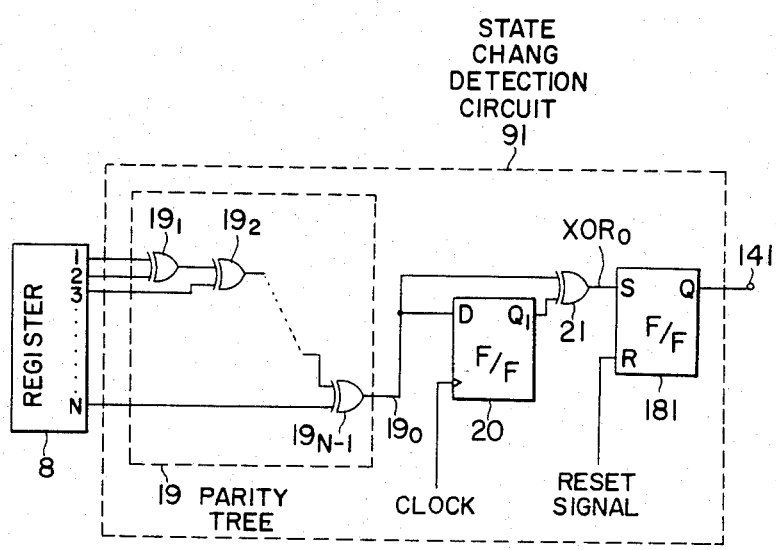
FIG. 5 is a connection diagram showing a modified state change detection circuit.

FIG. 5 shows a modified state change detection circuit. With the state change detection circuit 9 shown in FIG. 3, even when any one of the bits of the output of the register 8 changes, such change can be detected. Actually, however, among N bits of the content or output of the register 8, it is seldom that several bits change simultaneously. The state change detection circuit 91 shown in FIG. 5 is constructed such that it can detect the state change of odd number bits of the output of the register 8.

N outputs of the register are applied to a parity tree 19 constituted by (N−1) exclusive OR gate circuits $19_1$-$19_{N-1}$. The term "parity tree" is used herein to mean a group of exclusive OR gate circuits which are cascade connected such that the output of an exclusive OR gate circuit in a preceding stage is applied to the input of an exclusive OR gate circuit in a succeeding stage. The output $19_0$ of the parity tree 19 is applied to the delay input D of a delay flip-flop circuit 20 and to one input terminal of an exclusive OR gate circuit 21. The $Q_1$ output of the delay flip-flop circuit 20 is applied to the other input terminal of the exclusive OR gate circuit 21. The flip-flop circuit 20 is driven by a clock signal having a suitable frequency. The output $XOR_0$ of the exclusive OR gate circuit 21 is applied to the set terminal S of a RS type flip-flop circuit 181 and the output Q thereof is derived out through an output terminal 141.

Figure 6:
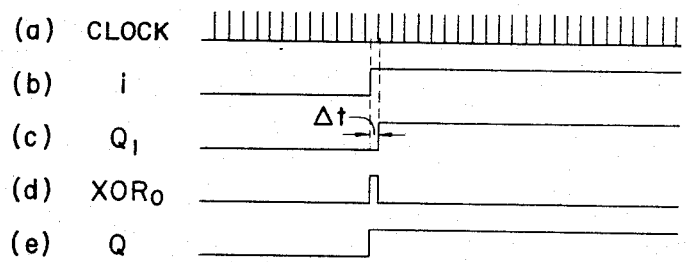
FIG. 6 is a timing chart showing signals at various portions of the circuit shown in FIG. 5.

In the timing chart shown in FIG. 6 curve (a) shows the clock pulse for driving the flip-flop circuit 20, curve (b) the output i of the register 8, curve (c) the output $Q_1$ of the flip-flop circuit 21, curve (d) the output $XOR_0$ of the exclusive OR gate circuit 21, and curve (e) the output Q of the flip-flop circuit 181. When the state of the first bit of the output of the register 8 changes due to external noise, etc., as shown in FIG. 6b, the output $Q_1$ of the flip-flop circuit 20 delays by $\Delta t$ as shown in FIG. 6c. Accordingly, the output $XOR_0$ of the exclusive OR gate circuit 21 becomes "1" during the delay time $\Delta t$ as shown in FIG. 6d and is applied to the set terminal S of the flip-flop circuit 181 so as to set its output to "1", as shown in FIG. 6e. As above described, change by one bit of the output of the register 8 can be detected by a state change detection circuit 91 made up of (N−1) exclusive OR gate circuits $19_1$-$19_N$, one delay circuit 1 (in this embodiment, in the form of a delay flip-flop circuit 20), and a RS flip-flop circuit 181 holding the output.

According to this invention, since the converter of the flow quantity measuring apparatus is constituted by a rate multiplier, and a register for setting a weight (multiplying factor) of the multiplier, it becomes easy to set the weight when the flow quantity measuring apparatus is miniaturized or fabricated with an integrated circuit. Moreover, as a state change detection circuit is provided for the converter, even when the state of the content of the register is caused to change by external noise or momentary interruption of a power source, such change can be detected by the state change detection circuit so that it is possible to simply check as to whether the display of the measured quantity is erroneous or not. Where the state change detection circuit is constituted by an exclusive OR gate circuit and a delay circuit it is possible to correctly know the state of the register after change thereof without storing the state of the register in independent memory means.

I claim:
1. A flow quantity measuring apparatus comprising:
   a detection circuit which produces a pulse signal corresponding to a flow speed of fluid to be measured;
   a converter which converts said pulse signal into an electric signal corresponding to a flow quantity of said fluid; and
   a counter for counting the number of said electric signals,
   said converter including a rate multiplier which receives said pulse signal and multiplies it by a stored predetermined present value to produce a rate multiplied output signal, a register for storing said preset value, and a state change detection circuit for detecting a change of a state of said register and providing an output signal indicative of said change of state.

2. The apparatus as defined in claim 1, wherein said state change detecting circuit comprises an exclusive OR gate circuit having one input terminal connected to receive an output signal of said register and a delay circuit connected to receive said output signal of said register, and means for applying a signal from said delay circuit to another input terminal of said exclusive OR gate circuit.

3. The apparatus as defined in claim 2, wherein said state change detecting circuit comprises a parity tree constituted by a plurality of cascade connected exclusive OR gate circuits receiving successive bits of an output of said register, another exclusive OR gate circuit with one input terminal connected to receive an output signal of said parity tree, and a delay flip-flop circuit having a delay input terminal connected to receive the output signal of said parity tree and an output terminal connected to another input terminal of said another exclusive OR gate circuit.

4. The apparatus as defined in claim 1, further comprising a flip-flop for holding the output of said state change detection circuit, said flip-flop being reset by an applied reset signal.

* * * * *